United States Patent
Friedman et al.

(10) Patent No.: US 11,122,129 B2
(45) Date of Patent: Sep. 14, 2021

(54) VIRTUAL NETWORK FUNCTION MIGRATION

(71) Applicant: Intel Corporation, Santa Clara, CA (US)

(72) Inventors: Ben-Zion Friedman, Jerusalem (IL); Eliezer Tamir, Bait Shemesh (IL); John J. Browne, Limerick (IE); Stephen Thomas Palermo, Paradise Valley, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/396,441

(22) Filed: Dec. 31, 2016

(65) Prior Publication Data

US 2018/0191838 A1    Jul. 5, 2018

(51) Int. Cl.
| | | |
|---|---|---|
| *H04L 29/08* | (2006.01) | |
| *H04L 12/46* | (2006.01) | |
| *H04L 12/24* | (2006.01) | |
| *H04L 12/14* | (2006.01) | |
| *H04L 12/403* | (2006.01) | |
| *H04L 29/06* | (2006.01) | |
| *H04M 15/00* | (2006.01) | |
| *H04L 12/803* | (2013.01) | |
| *H04W 4/24* | (2018.01) | |

(52) U.S. Cl.
CPC ........ *H04L 67/148* (2013.01); *H04L 12/1403* (2013.01); *H04L 12/1407* (2013.01); *H04L 12/403* (2013.01); *H04L 12/4641* (2013.01); *H04L 41/084* (2013.01); *H04L 41/0806* (2013.01); *H04L 41/0846* (2013.01); *H04L 47/125* (2013.01); *H04L 67/38* (2013.01); *H04M 15/66* (2013.01); *H04W 4/24* (2013.01); *H04L 41/0813* (2013.01); *H04L 41/5003* (2013.01)

(58) Field of Classification Search
CPC . H04L 67/148; H04L 12/1403; H04L 41/084; H04L 41/0813; H04L 47/33; H04L 45/54; H04L 41/0668; H04L 12/4641
See application file for complete search history.

(56) References Cited

U.S. PATENT DOCUMENTS

| | | | | |
|---|---|---|---|---|
| 7,941,510 | B1 * | 5/2011 | Tormasov | G06F 11/3006 709/220 |
| 2016/0170848 | A1 * | 6/2016 | Yang | G06F 11/2023 714/4.12 |
| 2016/0277509 | A1 * | 9/2016 | Qiang | H04L 67/1002 |

(Continued)

*Primary Examiner* — Jeffrey M Rutkowski
*Assistant Examiner* — Chae S Lee
(74) *Attorney, Agent, or Firm* — Patent Capital Group

(57) ABSTRACT

There is disclosed in an example, a computer-implemented method of providing network function virtualization orchestration (NFVO), including: determining that a first virtual network function (VNF) instance, providing a virtual service appliance on a virtual network, is to be migrated; provisioning a second VNF instance of the virtual service appliance; cloning configuration data from the first VNF to the second VNF; starting the second VNF without copying traffic data; and halting the first VNF. There is also disclosed an apparatus for performing the method, and a computer-readable medium having instructions for performing the method.

25 Claims, 8 Drawing Sheets

(56) References Cited

U.S. PATENT DOCUMENTS

| | | | |
|---|---|---|---|
| 2017/0017514 A1* | 1/2017 | Zhang | G06F 9/45558 |
| 2017/0139727 A1* | 5/2017 | Combellas | H04L 41/082 |
| 2017/0238171 A1* | 8/2017 | Huang | H04W 8/30 |
| | | | 455/424 |
| 2017/0364411 A1* | 12/2017 | Fan | G06F 3/0619 |
| 2019/0089814 A1* | 3/2019 | Rimac | H04L 41/0813 |

* cited by examiner

VIRTUAL NETWORK FUNCTION MIGRATION

FIELD OF THE SPECIFICATION

This disclosure relates in general to the field of network virtualization, and more particularly, though not exclusively to, a system and method for virtual network function migration.

BACKGROUND

Network function virtualization (NFV) is a method of providing certain network functions as virtual appliances. These functions may be referred to as virtual network functions (VNFs). In the past, the functions provided by these VNFs may have been provided by bespoke hardware service appliances.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
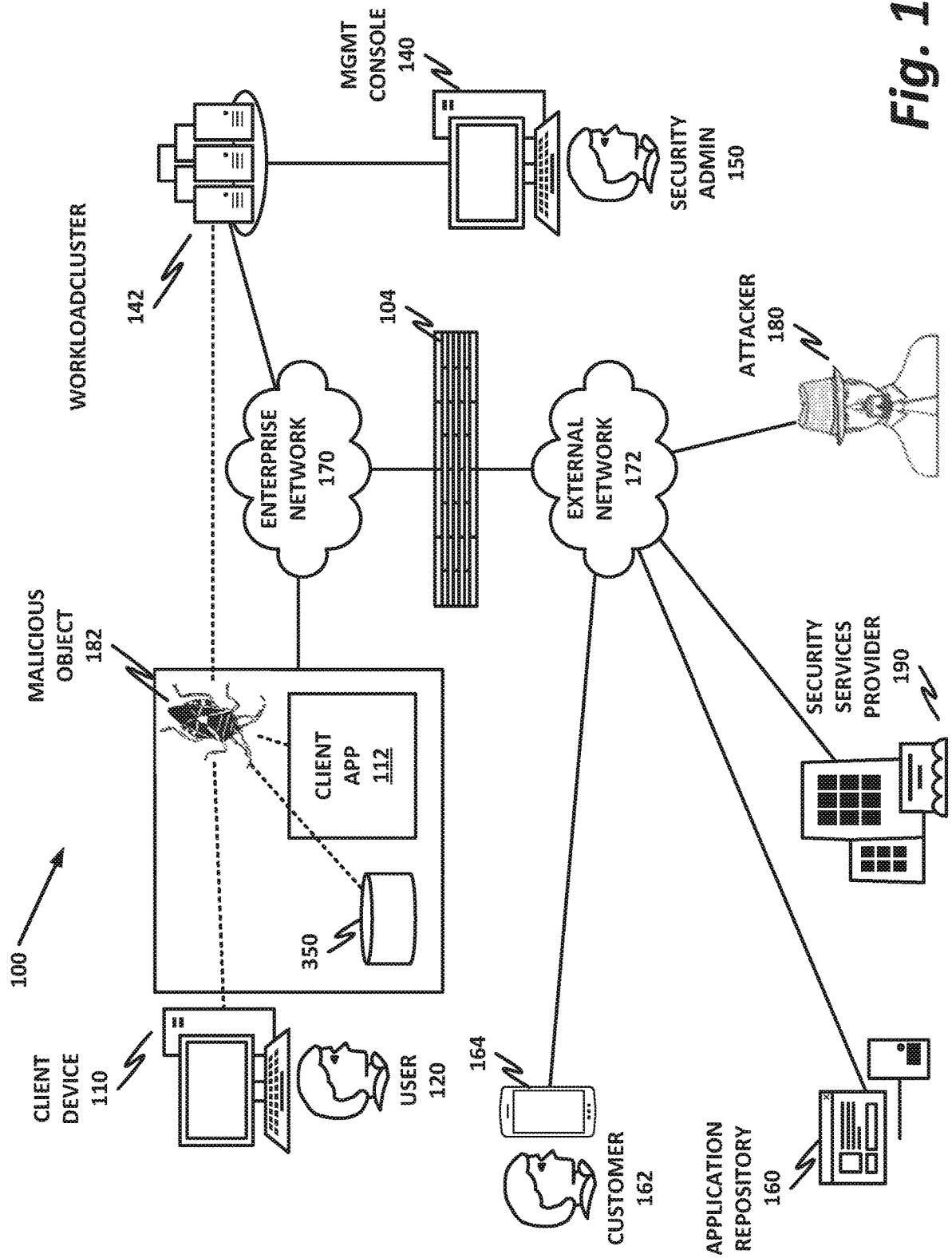
FIG. 1 is a block diagram of a security-enabled network according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Network function virtualization (NFV) provides advantages in terms of Capex and Opex, and also in terms of flexibility in provisioning workload services. However, NFV also presents new challenges. Because VNFs can be spun up and spun down quickly and easily, VNFs can be re-deployed to different hardware with relative ease. For example, if the current hardware platform has insufficient resources to meet demand, the VNF can be deployed to a more capable hardware platform with more compute capacity. But when a VNF is re-deployed, there is danger that even a momentary loss of functionality may disrupt network operations.

This may be particularly relevant where the VNF is a so-called "network forwarding function," in which the VNF does not substantively handle packets (e.g., like a web server), but rather provides some service for the network itself. In that case, the VNF examines or operates on the packet, and then forwards the packet to a different function. The nature of NFV is such that many VNFs are exactly this kind of network forwarding function. Because network forwarding functions can become a bottleneck in the overall network pipeline, it may be desirable to ensure that any downtime experienced when migrating a VNF is minimized. This can be even more important in the context of a VNF have than in the context of a workload server, because if a workload server experiences a disruption, a few packets in one session may be dropped. If a network forwarding function experiences a substantial disruption, the entire network may grind to a halt until that function is restored.

A network function migration may occur when there is a need to migrate a function from one physical hardware device to another. As an illustrative example, consider the case where certain network operations are to be migrated from a data center in Silicon Valley to a data center in Denver. In an enterprise network with a service level agreement (SLA) or other network requirements, it may not be good enough to just spin down the instance in Silicon Valley and spin up a new instance in Denver. The interruption of service in the meantime may be unacceptable to network operations. Thus, a process of VM migration is defined in which a network function is copied over "live" from one machine to the other. This involves copying not only the VM configuration and static data from disk, but also copying live memory pages so that when the new VM instance goes live, it is in substantially the same state as the old VM.

Disruptions of service may generally occur as network function virtualization orchestrator (NFVO) synchronizes a new instance of a VNF with the original instance. For example, while the orchestrator is provisioning and spinning up a new instance of the VNF, the old instance continues to receive packets and process data. Thus, a snapshot of the memory pages of the old instance may quickly become outdated. Generally, memory pages that have already been handled by software and copied to the new platform are marked "clean" by the software, whereas when hardware manipulates a memory page, it marks the page as "dirty" to indicate that the page has not yet been handled. In certain existing embodiments, the service provided by the VNF is halted on the network, and then an iterative process is used, wherein clean memory pages are copied over to the new VNF instance. If the number of remaining dirty pages is above a threshold, the process is repeated as more pages are cleaned, until the number of dirty pages falls beneath the threshold. The original and new instances of the VNF are then deemed sufficiently synchronized that the new VNF instance is started, the network is reconfigured to direct traffic to the new instance, and service is restored.

While these pages are being iteratively copied, the old VNF instance may or may not be live on the network. If it is, it will continue to receive incoming data, and will continue to dirty pages, and the process may never finish. Thus, before iterating through dirty pages, the orchestrator stops the original VNF instance from receiving new traffic. From the time that the original VNF instance is removed from the flow of traffic to the time that the new VNF instance goes live, the function of that VNF is unavailable. If that VNF is a network forwarding function in the flow of traffic, then for that time the entire network grinds to a halt. While that time may be very small in terms of human perception, it can represent a substantial disruption of network flow.

Embodiments of the present disclosure operate on the principle that in the case of a VNF, not all memory pages are created equal. In general, the memory pages of a VNF may be divided into at least three different classes. In this specification, these are referred to as traffic pages (memory that is handling the flow of traffic through the network, also referred to as traffic data), configuration pages (memory that contains configuration data such as routing tables, service chains, IP address, and other configuration data), and billing and statistics pages (e.g., for VoIP or other billed services, data for billing purposes, or other network usage statistics that may be of interest).

It is recognized herein that in many cases there is no need to synchronize "in-flight" traffic pages. Once the VNF handles a packet, it forwards the packet and has no further function with respect to that packet. Thus, there is no need to synchronize information about all packets that have traversed the network since the second VNF instance was spun up. Thus, in some embodiments, traffic pages can simply be ignored when synchronizing the original VNF to the new VNF. Advantageously, traffic pages are the most variable and the most frequently dirtied of the memory pages for a network forwarding function, and the iterative process of synchronizing them is often the primary factor in downtime experienced when migrating a VNF. So much of the disruption can be avoided by simply ignoring traffic page synchronization.

Billing and statistical data may be necessary to the function of the network, particularly in the context of VoIP, where billing statistics are critical to the business of the network operator. However, the billing and statistical data do not need to be maintained in real-time. Rather, when spinning up a new VNF instance, the orchestrator may take a single snapshot of the billing and statistical data from the old VNF as a baseline, copy that over to the new VNF, start the new VNF live on the network, and then retroactively synchronize any changes to billing and statistical data that occurred in the interim. Thus, there is no need to iteratively work through billing and statistics pages in real-time.

Configuration data for the VNF should optimally be maintained from one VNF instance to the other. Advantageously, configuration data are the least likely to change, the least frequently changed, and are generally much smaller in size than traffic data. While changes to configuration may occur occasionally, they are not frequent, and there is a very good chance that after the initial snapshot is taken, no changes will occur before the new VNF instance goes live. Thus, the orchestrator can take a snapshot of the configuration data, spin up the new VNF instance, and then check whether any changes have occurred to the configuration pages in the interim. If no changes have occurred, then the new VNF instance can go live with no additional changes. If changes have occurred, then it may be necessary to iteratively copy over changes. However, it is generally expected that this will take orders of magnitude fewer iterations then pursuing a relatively steady-state for traffic pages. Indeed, in most instances, the configuration can be successfully synchronized with between 0 and 2 additional iterations after the initial snapshot.

The system and method of the present specification presents methods that take advantage of these principles by migrating a VNF to a new instance with minimal disruption, for example by spinning up the new instance while disregarding changes to traffic pages, synchronizing only configuration in real-time, and retroactively correcting any changes that occur to billing and statistics. In some cases, rather than copying the configuration from live memory pages, the configuration may be copied from nonvolatile storage, such as the disk. This may further remove the need for iterations, and may again minimize the disruption to network services.

A system and method for virtual network function migration will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of an enterprise 100 according to one or more examples of the present specification. In the example of FIG. 1, enterprise 100 may be configured to provide services or data to one or more customers 162, who may operate user equipment 164 to access information or services via external network 172. This may require enterprise 100 to at least partly expose certain services and networks to the outside world, thus creating a logical security aperture. Thus certain embodiments of the system and method of the present specification are at least partly concerned with securing enterprise 100.

Within enterprise 100, one or more users 120 operate one or more client devices 110. Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within workload cluster 142. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

A workload cluster 142 may be provided, for example as a virtual cluster running in a hypervisor on a plurality of rack-mounted blade servers, or as a cluster of physical servers. Workload cluster 142 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agentful and agentless VMs.

It should also be noted that some functionality of endpoint devices 110 may also be provided via workload cluster 142. For example, one microcloud may provide a remote desktop hypervisor such as a Citrix workspace, which allows users 120 operating endpoints 110 to remotely login to a remote enterprise desktop and access enterprise applications, workspaces, and data. In that case, endpoint 110 could be a "thin client" such as a Google Chromebook, running only a stripped-down operating system, and still provide user 120 useful access to enterprise resources.

One or more computing devices configured as a management console 140 may also operate on enterprise network 170. Management console 140 may provide a user interface for a security administrator 150 to define enterprise security policies, which management console 140 may enforce on enterprise network 170 and across client devices 110 and workload cluster 142. In an example, management console 140 may run a server-class operating system, such as Linux, Unix, or Windows Server. In other case, management console 140 may be provided as a web interface, on a desktop-class machine, or via a VM provisioned within workload cluster 142.

Enterprise 100 may encounter a variety of "security objects" on the network. A security object may be any object that operates on or interacts with enterprise network 170 and that has actual or potential security implications. In one example, security objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Enterprise 100 may communicate across enterprise boundary 104 with external network 172. Enterprise boundary 104 may represent a physical, logical, or other boundary. External network 172 may include, for example, websites, servers, network protocols, and other network-based services. In one example, an application repository 160 is available via external network 172, and an attacker 180 (or other similar malicious or negligent actor) also connects to external network 172. A security services provider 190 may provide services to enterprise 100.

It may be a goal of users 120 and secure enterprise 100 to successfully operate client devices 110 and workload cluster 142 without interference from attacker 180 or from unwanted security objects. In one example, attacker 180 is a malware author whose goal or purpose is to cause malicious harm or mischief, for example by injecting malicious object 182 into client device 110. Once malicious object 182 gains access to client device 110, it may try to perform work such as social engineering of user 120, a hardware-based attack on client device 110, modifying storage 350 (FIG. 3), modifying client application 112 (which may be running in memory), or gaining access to enterprise servers 142.

The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this specification, malicious software ("malware") includes any security object configured to provide unwanted results or do unwanted work. In many cases, malware objects will be executable objects, including by way of non-limiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to application repository 160 may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Application repository 160 may represent a Windows or Apple "App Store" or update service, a Unix-like repository or ports collection, or other network service providing users 120 the ability to interactively or automatically download and install applications on client devices 110. If application repository 160 has security measures in place that make it difficult for attacker 180 to distribute overtly malicious software, attacker 180 may instead stealthily insert vulnerabilities into apparently-beneficial applications.

In some cases, enterprise 100 may provide policy directives that restrict the types of applications that can be installed from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 110.

Enterprise 100 may also contract with or subscribe to a security services provider 190, which may provide security services, updates, antivirus definitions, patches, products, and services. McAfee®, Inc. is a non-limiting example of such a security services provider that offers comprehensive security and antivirus solutions. In some cases, security services provider 190 may include a threat intelligence capability such as the global threat intelligence (GTI™) database provided by McAfee Inc. Security services provider 190 may update its threat intelligence database by analyzing new candidate malicious objects as they appear on client networks and characterizing them as malicious or benign.

In another example, enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

When a new object is first encountered on the network, security policies may initially treat it as "gray" or "suspect." As a first line of defense, a security appliance in cluster 142 may query security services provider 190 to see if the new object has a globally-recognized reputation. If so, a local reputation may be generated based on that global reputation. If not, the object is completely new and may be treated as a "candidate malicious object," meaning that its status is unknown, and it may therefore be a malicious object. At a minimum, the new object may be proscribed in its access to protected resources until its reputation can be established. This may mean that extra permission from a user 120 or security administrator 150 is required for the candidate malicious object to access protected resources.

The candidate malicious object may also be subjected to additional rigorous security analysis, particularly if it is a new object with no global reputation, or if it is an executable object. This may include, for example, submitting the object to an internal security audit, or to security services provider 190, for deep analysis. This may include running the object in a sandbox environment, expert status analysis, or other security techniques. These may help to establish a new reputation for the object.

If the object is permitted to operate on the network and malicious behavior is observed, the object may be tagged as malicious object 182. Remedial action may then be taken as appropriate or necessary. Thus, it is a goal of users 120 and security administrator 150 to configure and operate client devices 110, workload cluster 142, and enterprise network 170 so as to exclude all malicious objects, and to promptly and accurately classify candidate malicious objects.

Figure 2:
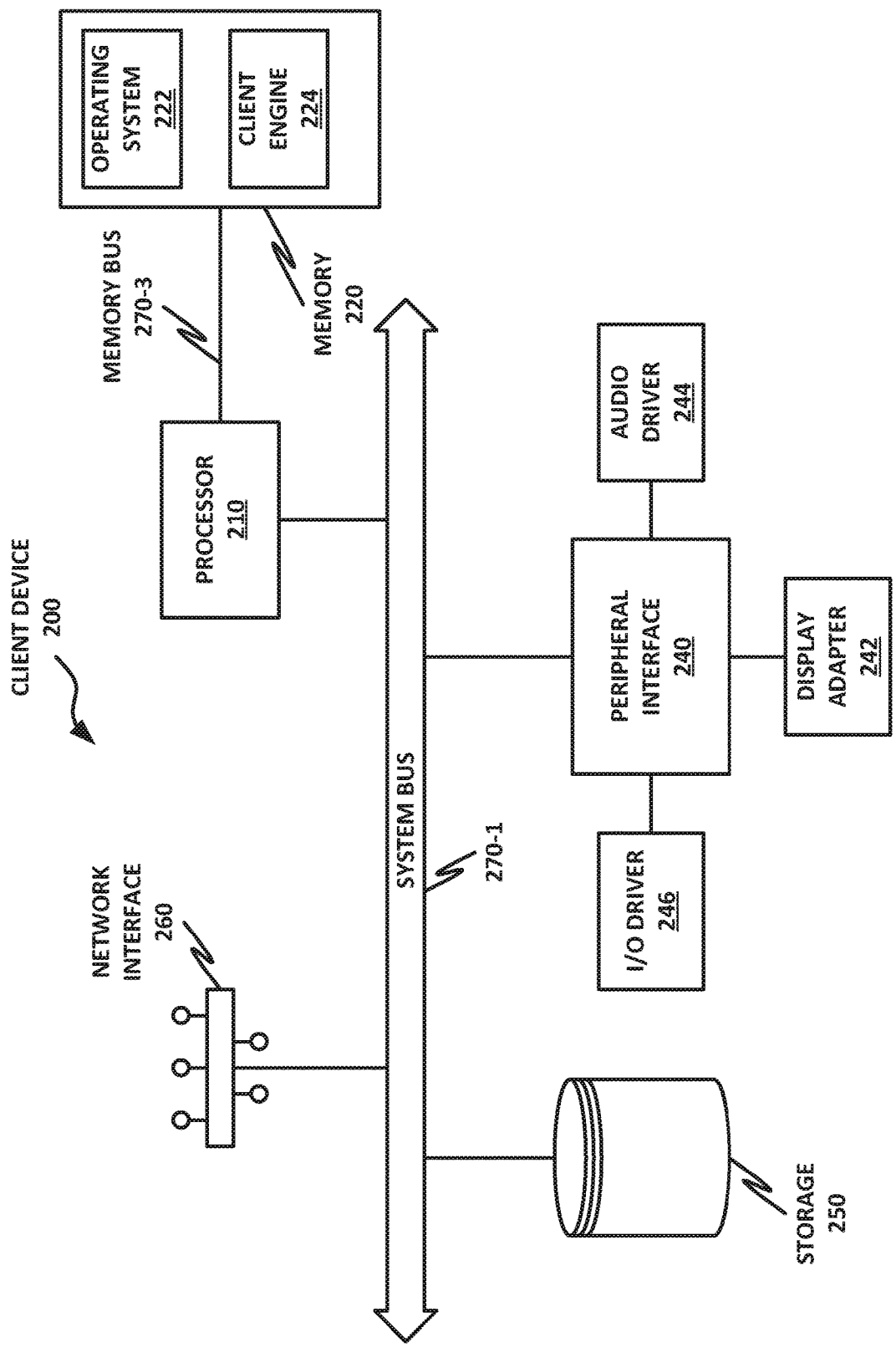
FIG. 2 is a block diagram of a computing device according to one or more examples of the present specification.

FIG. 2 is a block diagram of client device 200 according to one or more examples of the present specification. Client device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

In certain embodiments, client devices 110 and user equipment 164 may all be examples of client devices 200.

Client device 200 includes a processor 210 connected to a memory 220, having stored therein executable instructions for providing an operating system 222 and at least software portions of a client engine 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Operating system 222 may be provided, though it is not necessary in all embodiments. For example, some embedded systems operate on "bare metal" for purposes of speed, efficiency, and resource preservation. However, in contemporary systems, it is common for even minimalist embedded systems to include some kind of operating system. Where it is provided, operating system 222 may include any appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. Embedded devices often use an embedded Linus or a dedicated embedded OS such as VxWorks. However, these examples are not intended to be limiting.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), redundant array of independent nodes (RAIN), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of client engine 224. In some examples, storage 250 may be a non-transitory computer-readable storage medium that includes hardware instructions or logic encoded as processor instructions or on an ASIC. Many other configurations are also possible, and are intended to be encompassed within the broad scope of this specification.

Network interface 260 may be provided to communicatively couple client device 200 to a wired or wireless network. A "network," as used throughout this specification, may include any communicative platform or medium operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Client engine 224, in one example, is operable to carry out computer-implemented methods as described in this specification. Client engine 224 may include one or more tangible non-transitory computer-readable mediums having stored thereon executable instructions operable to instruct a processor to provide a client engine 224. As used throughout this specification, an "engine" includes any combination of one or more logic elements, of similar or dissimilar species, operable for and configured to perform one or more methods provided by the engine. Thus, client engine 224 may comprise one or more logic elements configured to provide methods as disclosed in this specification. In some cases, client engine 224 may include a special integrated circuit designed to carry out a method or a part thereof, and may also include software instructions operable to instruct a processor to perform the method. In some cases, client engine 224 may run as a "daemon" process. A "daemon" may include any program or series of executable instructions, whether implemented in hardware, software, firmware, or any combination thereof that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space" associated with ring 0, 1, or 2 in a protection ring architecture. It should also be noted that client engine 224 may also include other hardware and software, including configuration files, registry entries, and interactive or user-mode software by way of non-limiting example.

In one example, client engine 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of client engine 224 to provide the desired method.

Client engine 224 may provide instructions for a device, such as client device 110 or user equipment 164 to access network resources provided by secure network 100.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

Figure 3:
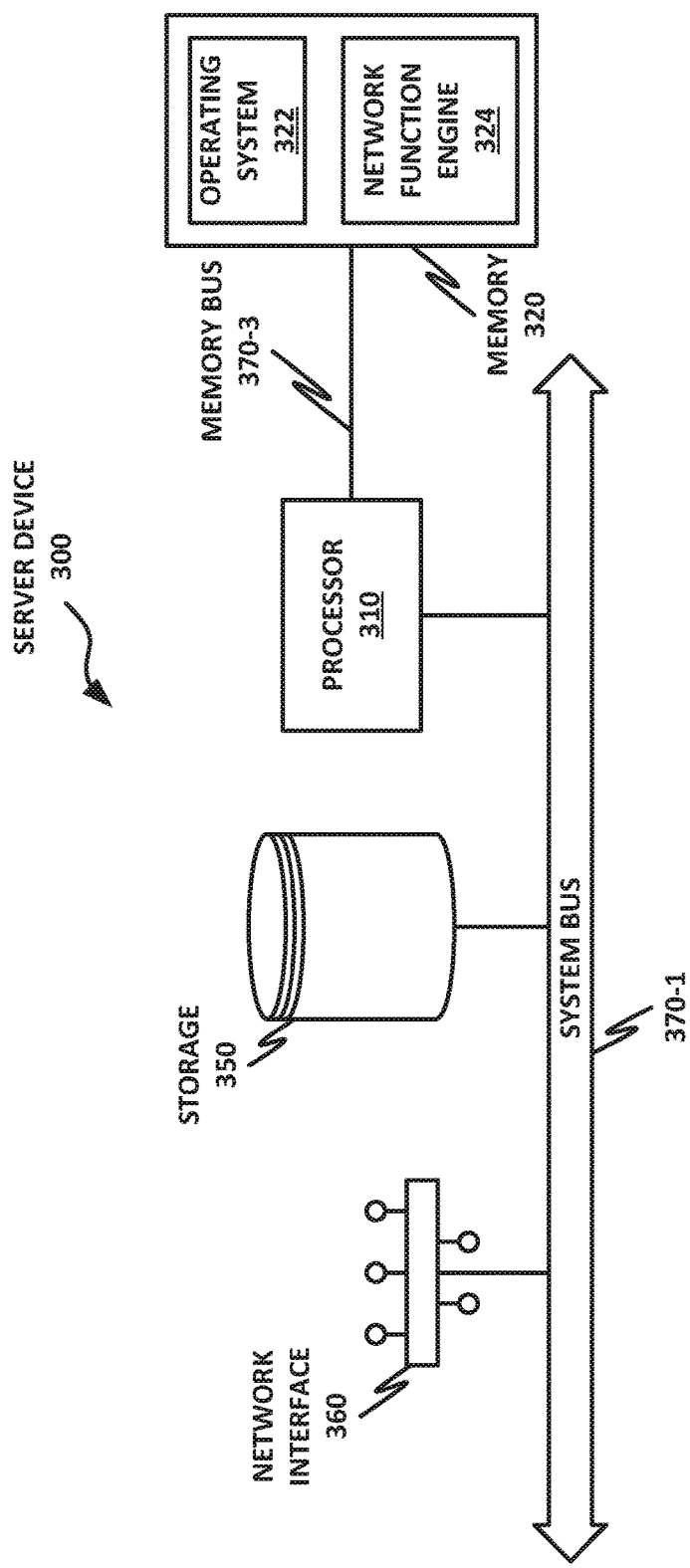
FIG. 3 is a block diagram of a server according to one or more examples of the present specification.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein client device 200 provides certain localized tasks, while server 300 provides certain other centralized tasks. In contemporary practice, server 300 is more likely than client device 200 to be provided as a "headless" VM running on a computing cluster, or as a standalone appliance, though these configurations are not required.

Server 300 includes a processor 310 connected to a memory 320, having stored therein executable instructions for providing an operating system 322 and at least software portions of a network function engine 324. Other components of server 300 include a storage 350, and a network interface 360. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of network function engine 324.

Network interface 360 may be provided to communicatively couple server 300 to a wired or wireless network, and may include one or more logic elements as described in FIG. 2.

Network function engine 324 is an engine as described in FIG. 2 and, in one example, includes one or more logic elements operable to carry out computer-implemented methods as described in this specification. Software portions of network function engine 324 may run as a daemon process.

Network function engine 324 may include one or more non-transitory computer-readable mediums having stored thereon executable instructions operable to instruct a processor to provide network function engine 324. At an appropriate time, such as upon booting server 300 or upon a command from operating system 322 or a user 120 or security administrator 150, processor 310 may retrieve a copy of network function engine 324 (or software portions thereof) from storage 350 and load it into memory 320. Processor 310 may then iteratively execute the instructions of network function engine 324 to provide the desired method.

Network function engine 324 may enable the server to provide a network function, including a service appliance, a virtual service appliance, a virtualized function, or a virtual network function (VNF) as described herein.

Figure 4:
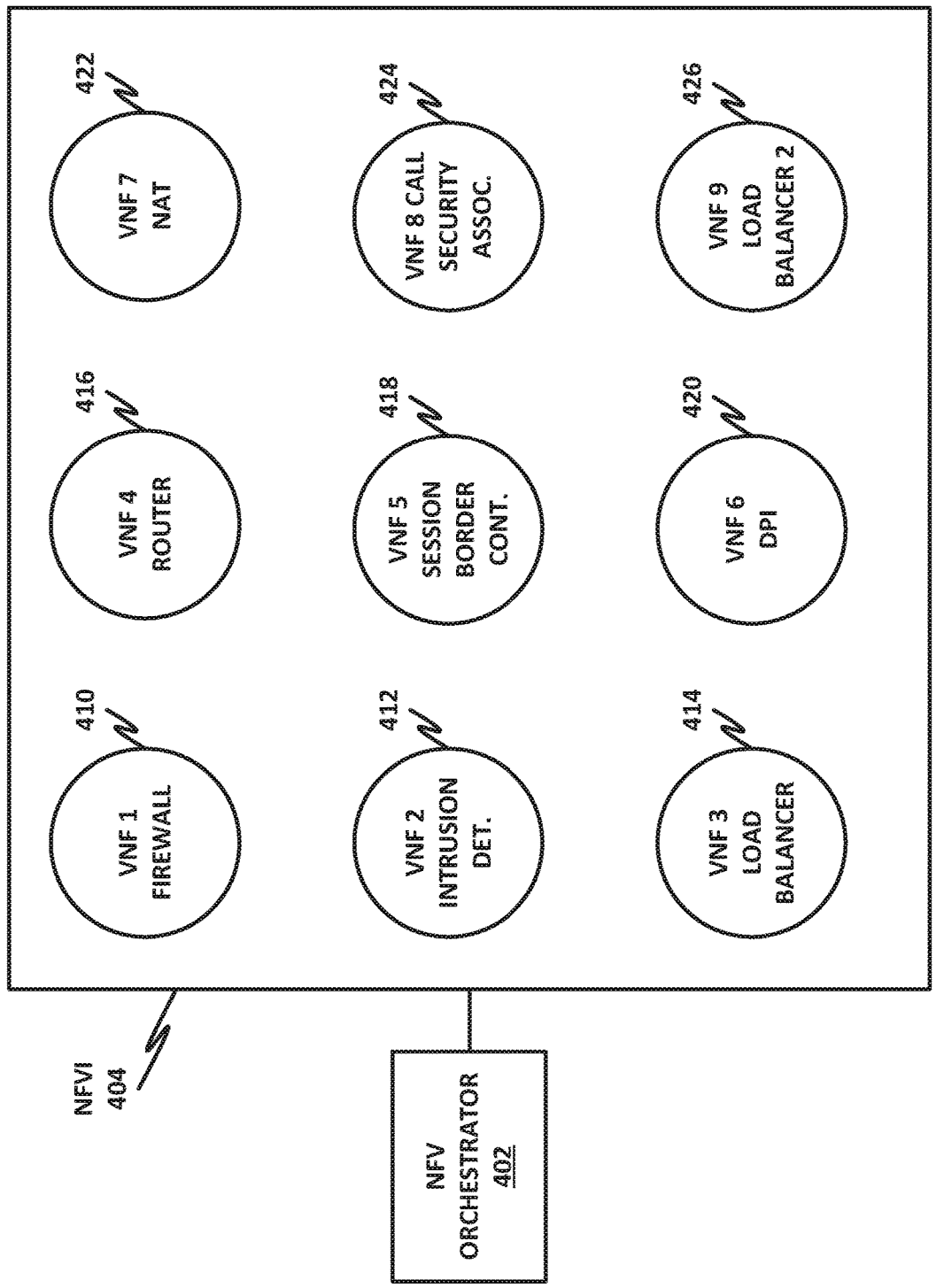
FIG. 4 is a block diagram illustrating a network function virtualization architecture according to one or more examples of the present specification.

FIG. 4 is a block diagram of a network function virtualization (NFV) architecture according to one or more examples of the present specification. NFV is a subset of network virtualization. Network virtualization may take many forms. For example, in software defined networking (SDN), a data plane is separated from a control plane to realize certain advantages.

NFV is another flavor of network virtualization, often treated as an add-on or improvement to SDN, but sometimes treated as a separate entity. NFV was originally envisioned as a method for providing reduced capital expenditure (Capex) and operating expenses (Opex) for telecommunication services, which relied heavily on fast, single purpose service appliances. One important feature of NFV is replacing proprietary, special-purpose hardware appliances with virtual appliances running on commercial off-the-shelf (COTS) hardware with in a virtualized environment. In addition to Capex and Opex savings, NFV provides a more agile and adaptable network. As network loads change, virtual network functions (VNFs) can be provisioned ("spun up") or removed ("spun down") to meet network demands. For example, in times of high load, more load balancer VNFs may be spun up to distribute traffic to more workload servers (which may themselves be virtual machines). In times where more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI). Often, the VNFs are in-line service functions that are separate from workload servers or other nodes (in many cases, workload-type functions were long since virtualized). These VNFs can be chained together into a service chain, which may be defined by a virtual subnetwork, and which may include a serial string of network services that provide behind-the-scenes work, such as security, logging, billing, and similar. In one example, an incoming packet passes through a chain of services in a service chain, with one or more of the services being provided by a VNF, whereas historically each of those functions may have been provided by bespoke hardware in a physical service appliance. Because NFVs can be spun up and spun down to meet demand, the allocation of hardware and other resources can be made more efficient. Processing resources can be allocated to meet the greatest demand, whereas with physical service appliances, any unused capacity on an appliance is simply wasted, and increasing capacity to meet demand required plugging in a physical (expensive) bespoke service appliance.

In the example of FIG. 4, an NFV orchestrator 402 manages a number of the VNFs running on in an NFVI 404. NFV requires non-trivial resource management, such as allocating a very large pool of compute resources among appropriate numbers of instances of each VNF, managing connections between VNFs, determining how many instances of each VNF to allocate, and managing memory, storage, and network connections. This may require complex software management, thus the need for NFV orchestrator 402.

Note that VNF orchestrator 402 itself is usually virtualized (rather than a special-purpose hardware appliance). NFV orchestrator 402 may be integrated within an existing SDN system, wherein an operations support system (OSS) manages the SDN. This may interact with cloud resource management systems (e.g., OpenStack) to provide NVF orchestration. There are many commercially-available, off-the-shelf, proprietary, and open source solutions for NFV orchestration and management (sometimes referred to as NFV MANO). In addition to NFV orchestrator 402, NFV MANO may also include functions such as virtualized infrastructure management (VIM) and a VNF manager.

An NFVI 404 may include the hardware, software, and other infrastructure to enable VNFs to run. This may include, for example, a rack or several racks of blade or slot servers (including, e.g., processors, memory, and storage), one or more data centers, other hardware resources distributed across one or more geographic locations, hardware switches, network interfaces. An NFVI 404 may also include the software architecture that enables hypervisors to run and be managed by NFV orchestrator 402. NFVI 402 may include NFVI points of presence (NFVI-PoPs), where VNFs are deployed by the operator.

Running on NFVI 404 are a number of virtual machines, each of which in this example is a VNF providing a virtual service appliance. These include, as nonlimiting and illustrative examples, VNF 1 410, which is a firewall, VNF 2 412, which is an intrusion detection system, VNF 3 414, which is a load balancer, VNF 4 416, which is a router, VNF 5 418, which is a session border controller, VNF 6 420, which is a deep packet inspection (DPI) service, VNF 7 422, which is a network address translation (NAT) module, VNF 8 424, which provides call security association, and VNF 9 426, which is a second load balancer spun up to meet increased demand.

Firewall 410 is a security appliance that monitors and controls the traffic (both incoming and outgoing), based on matching traffic to a list of "firewall rules." Firewall 410 may be a barrier between a relatively trusted (e.g., internal) network, and a relatively untrusted network (e.g., the internet). Once traffic has passed inspection by firewall 410, it may be forwarded to other parts of the network.

Intrusion detection 412 monitors the network for malicious activity or policy violations. Incidents may be reported to security administrator 150, or collected and analyzed by a security information and event management (SIEM) system. In some cases, intrusion detection 412 may also include antivirus or antimalware scanners.

Load balancers 414 and 426 may farm traffic out to a group of substantially identical workload servers to distribute the work in a fair fashion. In one example, a load balancer provisions a number of traffic "buckets," and assigns each bucket to a workload server. Incoming traffic is assigned to a bucket based on a factor, such as a hash of the source IP address. Because the hashes are assumed to be fairly evenly distributed, each workload server receives a reasonable amount of traffic.

Router 416 forwards packets between networks or subnetworks. For example, router 416 may include one or more ingress interfaces, and a plurality of egress interfaces, with each egress interface being associated with a resource, subnetwork, virtual private network, or other division. When traffic comes in on an ingress interface, router 416 determines when destination it should go to, and routes the packet to the appropriate egress interface.

Session border controller 418 controls voice over IP (VoIP) signaling, as well as the media streams to set up, conduct, and terminate calls. In this context, "session" refers to a communication event (e.g., a "call"). "Border" refers to a demarcation between two different parts of a network (similar to a firewall).

DPI appliance 420 provides deep packet inspection, including examining not only the header, but also the content of a packet to search for potentially unwanted content (PUC), such as protocol non-compliance, malware, viruses, spam, or intrusions.

NAT module 422 provides network address translation services to remap one IP address space into another (e.g., mapping addresses within a private subnetwork onto the larger internet).

Call security association 424 creates a security association for a call or other session (see session border controller 418 above). Maintaining this security association may be critical, as the call may be dropped if the security association is broken.

The illustration of FIG. 4 shows that a number of VNFs have been provisioned and exist within NFVI 404. This figure does not necessarily illustrate any relationship between the VNFs and the larger network.

Figure 5:
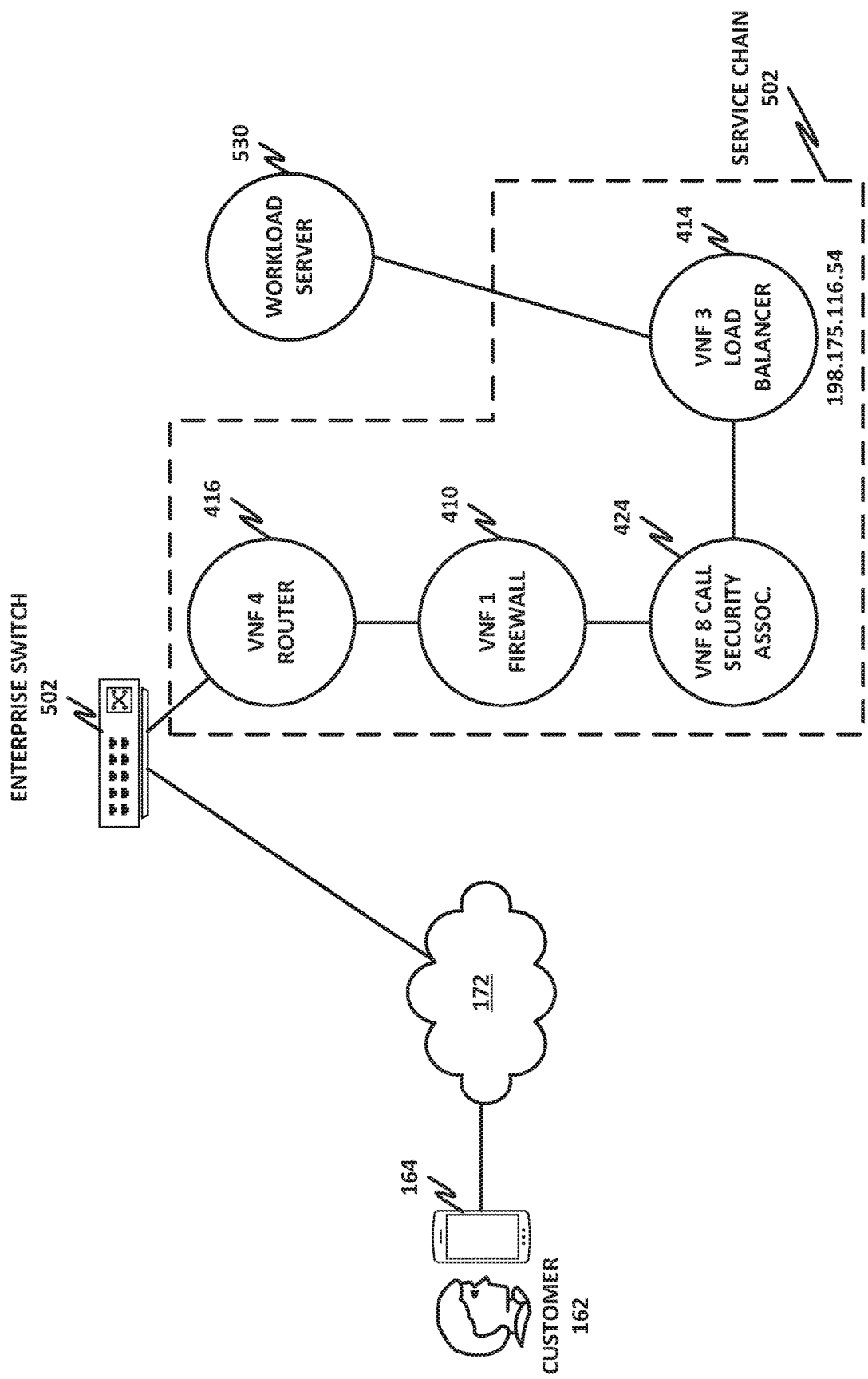
FIG. 5 is a block diagram of service chain according to one or more examples of the present specification.

FIG. 5 illustrates an example service chain 502, which may include one or more VNFs. Note that service chain 502 is provided only as an illustrative example, and that certain selected VNFs are shown to illustrate how the functions may be chained together. Service chain 502 is not necessarily a complete service chain. Certain hops in the service chain may be omitted for the purpose of simplicity. Furthermore, not all of the VNFs in service chain 502 are necessary in all cases, and in a general sense, any suitable number of VNFs, in any order, may be chained together to form a service chain according to the needs of a particular application.

In this example, customer 162 operates user equipment 164 to communicate with secured enterprise 100 via network 172. In this example, customer 162 may be trying to access an internet resource available at IP address 198.175.116.54, operated by secured enterprise 100. When customer 162 issues a request to the IP address, network 172 looks up the IP address and forwards a request to enterprise switch 502 operated by secured enterprise 100. In this case, IP address 198.175.116.54 may actually map to a load balancer 414. However, before the packet is provided to load balancer 414, it may need to traverse several network functions.

First, enterprise switch 502 directs the packet to a router 416. Router 416 may look up the IP address and determine which virtual subnetwork the traffic should be directed to, and what service chain should applied. According to the service chain, router 416 then forwards the packet to firewall 410.

Firewall 410 may have certain firewall rules that determine whether the packet should be blocked or forwarded, or otherwise disposed. After firewall 410 has inspected the packet and determined that it should be forwarded, it is sent to call security association appliance 424.

In this case, if the data includes a voice over IP call, call security association appliance 424 may create a security association for the call and attach it to the packet. Call security association appliance 424 then forwards the packet to load balancer 414, which has the IP address 198.175.116.54. Load balancer 414 applies a load-balancing algorithm to direct the packet to one of a plurality of workload servers 530. The selected workload server 530 receives the packet and handles it.

Note that because service chain 502 includes a series of linear transactions, any service appliance within service chain 502 can become a bottleneck if it is unnecessarily delayed. Thus, isn't it is advantageous to ensure that service appliances hosted on VNFs are low latency and can handle traffic in an efficient manner to ensure that the service chain 502 does not become a bottleneck for the overall network architecture.

Figure 6:
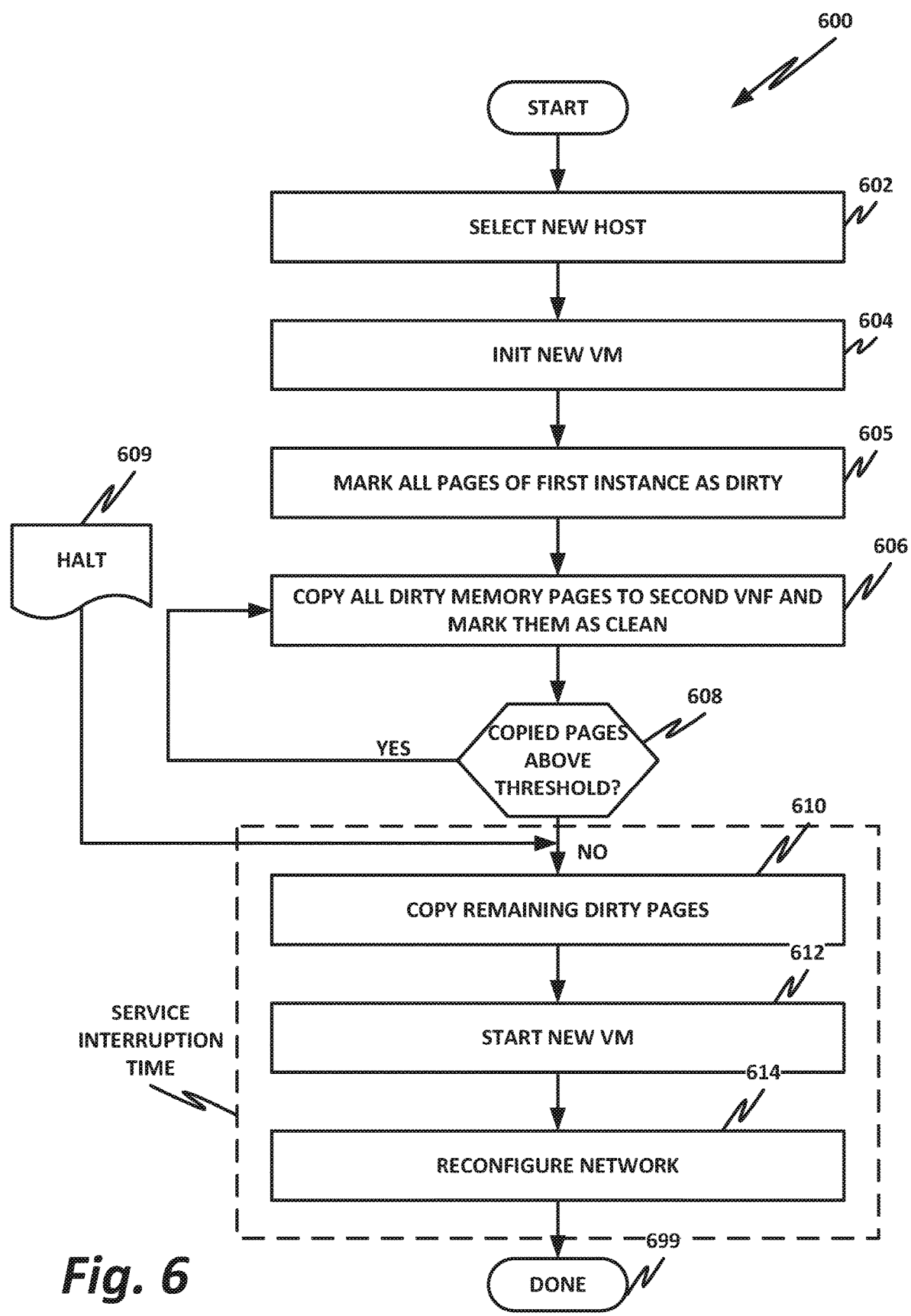
FIG. 6 is a flow chart of a method of a migration method according to one or more examples of the present specification.

FIG. 6 is a flowchart of a method 600 of performing a VM migration from a first VNF instance to a second VNF instance according to one or more examples of the present specification.

In block 602, orchestrator 402 selects a host to provide the VNF. This may be responsive to a change in demand, or to a need to migrate from one hardware device to another, one data center to another, or any other impetus that drives the need to migrate a VNF instance from one host device to another.

In block 604, orchestrator 402 initializes the new VM in a stopped state. This may include copying the "constant" parts of the VM, including the software binaries. Once the memory pages are copied over from the first VNF instance of the second VNF instance, the second VNF instance will be in a state that it can be started as though from a suspended state.

In block 605, all memory pages on the first instance of the VNF are marked as "dirty."

In block 606, as part of an iterative process, orchestrator 402 copies all "dirty" pages from memory, marking them as "clean" as they are copied. Note that after this copy occurs, a CPU write may occur, and some pages may be marked as dirty again, meaning that they will need to be recopied.

In decision block 608, orchestrator 402 determines whether there are a number of dirty memory pages above an acceptable threshold. If there are more dirty memory pages then is acceptable, then returning to block 606, orchestrator 402 continues to copy clean memory pages as they are cleaned, and continues copying and checking until the number of dirty pages is below the threshold. Note that block 608 could also be based on a timer instead of or in cooperation with the threshold (e.g., copying ceases once too much time has passed, regardless of how many dirty pages are left).

After the number of dirty pages is below the acceptable threshold, in block 609, orchestrator 402 halts the first VNF instance so that it ceases to perform its network forwarding function while memory pages are copied. This represents the start of disruption of network services.

In block 610, orchestrator 402 copies the remaining dirty pages over to the second VNF instance.

In block 612, orchestrator 402 starts the new VM providing the second VNF instance.

In block 614, orchestrator 402 reconfigures the network so that it is aware of the location of the new VNF instance, and traffic is correctly directed to the new VNF instance instead of the previous location of the old VNF instance.

In block 699, the method is done.

Note that from block 610 to block 614, the function provided by the first VNF is interrupted while memory pages are being copied and the new VM is started. If the VNF is a network forwarding function, this may represent a complete blockage of the network until the VNF is restored.

Figure 7:
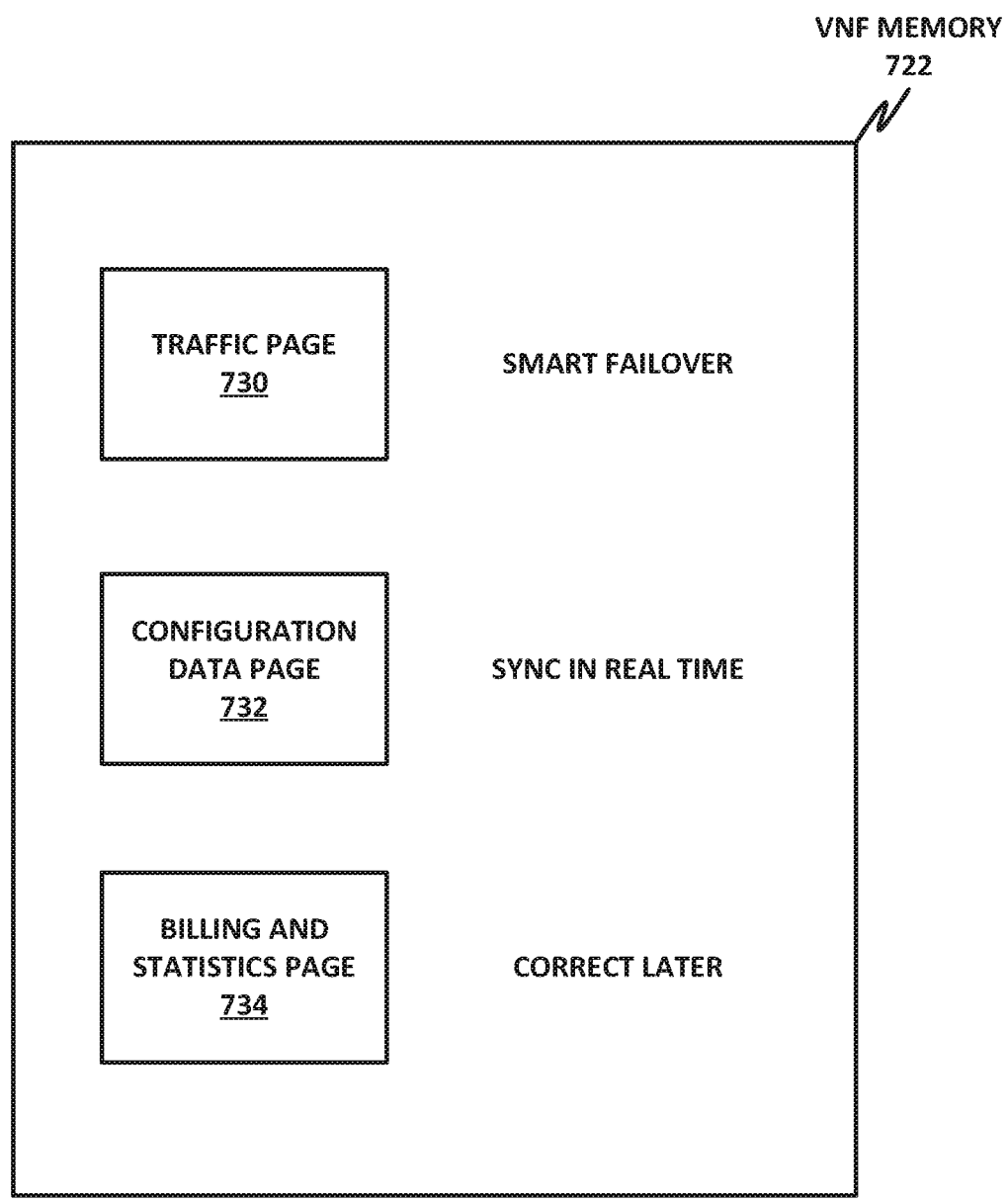
FIG. 7 is a block diagram of memory pages according to one or more examples of the present specification.

FIG. 7 is a block diagram illustrating the presence of different types of memory pages in VNF memory 722. Specifically, VNF memory 722 may include traffic pages 730, configuration data pages 732, and billing and statistics pages 734. As described herein, not all these pages are of equal value to the new instance of the VNF.

For example, in a network forwarding function, traffic pages 730 represent data that are handled and then forwarded to other hosts in the network. In many cases, it is neither necessary nor beneficial to copy over information about these packets after they have been handled. Thus, in provisioning the second VNF instance, orchestrator 402 may simply ignore these traffic pages. To further minimize disruption, the two instances of the VNF may be operated concurrently in a smart failover fashion. For example, an intelligent load balancer gradually redirects traffic from the old VNF instance to the new VNF instance until the new VNF instance has completely taken over the network function. Once all outstanding transactions that relied on the old VNF instance are complete, the old VNF instance can be spun down, and the new VNF instance seamlessly manages that network function.

In the case of billing and statistics pages 734, a single snapshot of these can be taken to create a baseline, the snapshot can be copied to the second VNF to clone these pages, and the second VNF can then start functioning. Once the first VNF is removed from the network, the billing and statistical data can be retroactively synchronized and reconciled. Thus, there may be no need to iteratively synchronize the billing and statistics pages, and thus no need to have a disruption in the network function.

In the case of configuration data 732, these may need to be synchronized in real time. However, as explained herein, these pages are not expected to change frequently. Thus, after the initial snapshot is taken, the configuration data page can be synchronized in real time, often with between 0 and 2 additional iterations. Thus, the disruption time (if any) is minimized. In some cases, configuration data are not copied from live memory, but rather are copied from nonvolatile memory, such as from the disk. In this case, there may be no need to perform any iterative synchronization at all.

Figure 8:
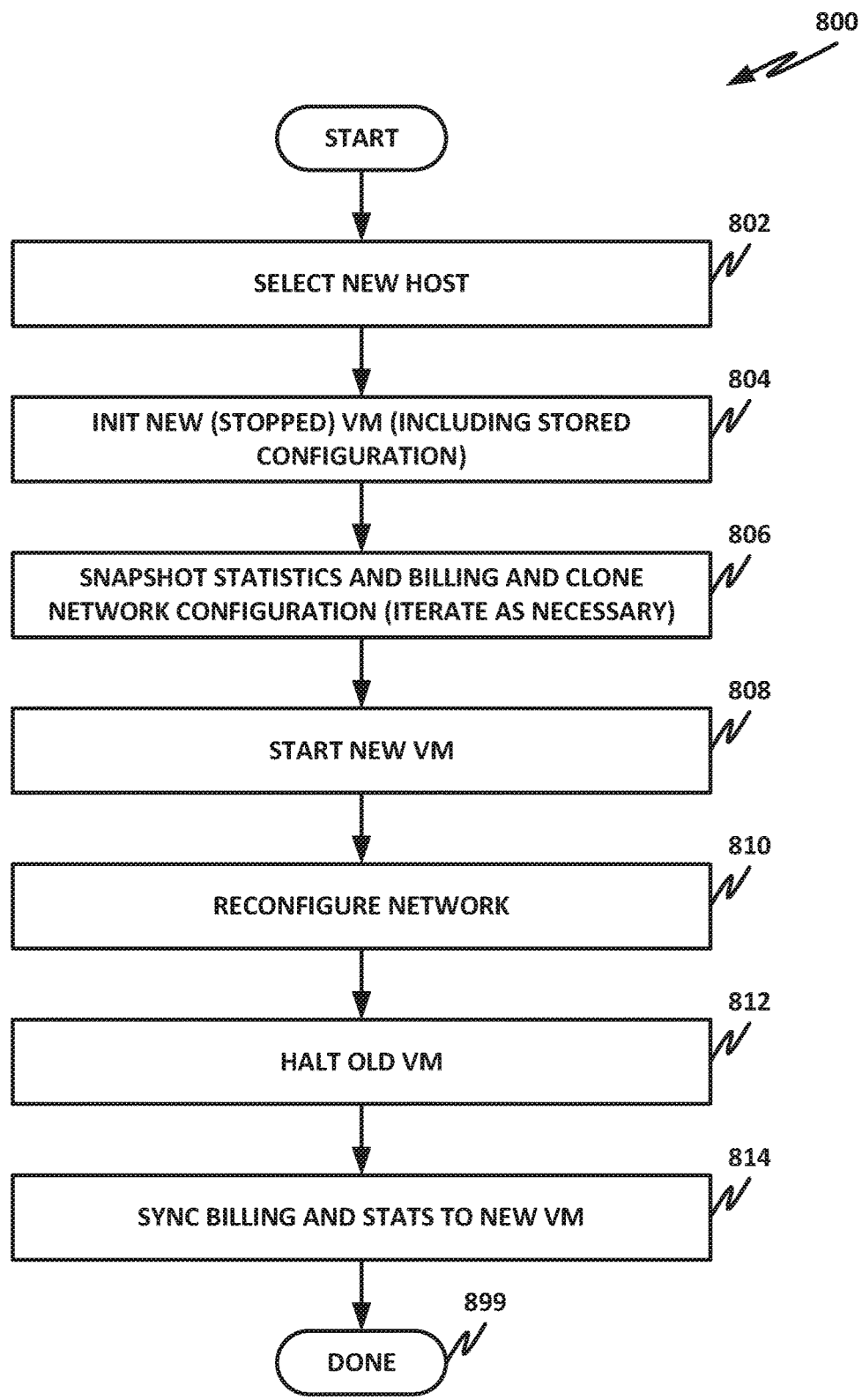
FIG. 8 is a flow chart of a migration method according to one or more examples of the present specification.

FIG. 8 is a flowchart of a method 800 of synchronizing a virtual network function according to one or more examples of the present specification.

In block 802, orchestrator 402 selects a new host as described in FIG. 6.

In block 804, orchestrator 402 initializes a new stopped instance of the VM providing the VNF. This may include copying the constant parts, including the software binaries and stored configuration data.

In block 806, orchestrator 402 takes a snapshot of the current billing and statistics data to provide a cloned baseline, and also clones from live memory any network configuration (if necessary to the embodiment). The cloning of the network configuration may require some iteration, but this may generally be expected to be minimal.

In block 808, orchestrator 402 starts the new VM instance.

In block 810, orchestrator 402 reconfigures the network to direct traffic to the new VNF instance. Configure the network to move the data through the new instance. In some cases, this is done gradually, such as by using a load balancer to redirect progressively more flows to the new VNF instance. Eventually, the old instance is not receiving any flows.

In block 812, orchestrator 402 halts the old VM instance. Note that up to this point, the old VM instance may continue to handle incoming traffic and perform its forwarding function. Thus, between blocks 804 and block 812, traffic pages 730 may be expected to get out of sync between the two instances of the VNF. However, because there is generally no need for the VNF to know about the interim traffic, the loss of these data pages is harmless. Also note that in many cases, the billing and statistics data will have changed in the interim, and may thus need to be reconciled. In most cases, the configuration data will not have changed in the interim. If the configuration has changed, there may be some minimal disruption while the configuration data states are synced.

In block 814, orchestrator 402 synchronizes and reconciles the billing and statistics data between the old instance of the VNF and the new instance, ensuring that the new instance now has a correct billing and statistics data page.

In block 899, the method is done.

Note that method 800 reconfigures the new VM without copying traffic data over from the old VM instance. As described above, this is advantageous because the traffic pages, containing the traffic data, are generally both the largest and the most dynamic pages in memory. Copying them over and synchronizing them can be responsible for a substantial share of service interruption between the two instances. Traffic data are also, in many cases, the least valuable pages to synchronize because once the VNF handles a traffic packet, it is no longer relevant to the VNF.

This novel VNF transfer process differentiates the types of data used by the VM and provides a VM migration process to transfer only the key information required to restore VM service as quickly as possible, by transferring the minimum information required, and keeping the old VM instance alive and providing service for as long as possible, instead of halting the VM as part of the VM migration operation.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices 110 or server devices 300 may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 210, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 250 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 220 and storage 250, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 210 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed in one example, a computing apparatus, comprising: a processor; a memory; and one or more logic elements comprising a network function virtualization orchestrator (NFVO) engine to: determine that a first virtual network function (VNF) instance, providing a virtual service appliance on a virtual network, is to be migrated; provision a second VNF instance of the virtual service appliance; clone configuration data from the first VNF to the second VNF; start the second VNF without copying traffic data; and halt the first VNF.

There is also disclosed an example, wherein the VNF is a network forwarding function.

There is also disclosed an example, wherein the NFVO engine is further to reconfigure the virtual network.

There is also disclosed an example, wherein reconfiguring the virtual network comprises gradually redirecting traffic from the first VNF to the second VNF.

There is also disclosed an example, wherein reconfiguring the virtual network comprises performing ordered close of management interface sessions on the first VNF There is also disclosed an example, wherein the NFVO engine is to provide smart failover from the first VNF to the second VNF.

There is also disclosed an example, wherein cloning the configuration data comprises iterating until a page containing the configuration data is clean.

There is also disclosed an example, wherein the configuration data comprises routing tables.

There is also disclosed an example, wherein cloning the configuration data comprises reading the configuration data from a disk.

There is also disclosed an example, wherein the NFVO engine is further to read static data for the first VNF from non-volatile storage.

There is also disclosed an example, wherein the NFVO engine is further to take a single snapshot of billing or statistical data from the first VNF.

There is also disclosed an example, wherein the NFVO is further to retroactively correct the billing or statistical data.

There is also disclosed an example of one or more tangible, non-transitory computer-readable storage mediums having stored thereon executable instructions for providing a network function virtualization orchestrator (NFVO) engine to: determine that a first virtual network function (VNF) instance, providing a virtual service appliance on a virtual network, is to be migrated; provision a second VNF instance of the virtual service appliance; clone configuration data from the first VNF to the second VNF; start the second VNF without copying traffic data; and halt the first VNF.

There is also disclosed an example, wherein the VNF is a network forwarding function.

There is also disclosed an example, wherein the NFVO engine is further to reconfigure the virtual network.

There is also disclosed an example, wherein reconfiguring the virtual network comprises gradually redirecting traffic from the first VNF to the second VNF.

There is also disclosed an example, wherein reconfiguring the virtual network comprises performing ordered close of management interface sessions on the first VNF There is also disclosed an example, wherein cloning the configuration data comprises iterating until a page containing the configuration data is clean.

There is also disclosed an example, wherein the configuration data comprises routing tables.

There is also disclosed an example, wherein cloning the configuration data comprises reading the configuration data from a disk.

There is also disclosed an example, wherein the NFVO engine is further to read static data for the first VNF from non-volatile storage.

There is also disclosed an example, wherein the NFVO engine is further to take a single snapshot of billing or statistical data from the first VNF.

There is also disclosed an example, wherein the NFVO is further to retroactively correct the billing or statistical data.

There is also disclosed an example of a computer-implemented method of providing network function virtualization orchestration (NFVO), comprising: determining that a first virtual network function (VNF) instance, providing a virtual service appliance on a virtual network, is to be migrated; provisioning a second VNF instance of the virtual service appliance; cloning configuration data from the first VNF to the second VNF; starting the second VNF without copying traffic data; and halting the first VNF.

There is also disclosed an example, wherein the VNF is a network forwarding function.

There is also disclosed an example, further comprising reconfiguring the virtual network.

There is also disclosed an example, wherein reconfiguring the virtual network comprises gradually redirecting traffic from the first VNF to the second VNF.

There is also disclosed an example, wherein reconfiguring the virtual network comprises performing ordered close of management interface sessions on the first VNF There is also disclosed an example, further comprising providing smart failover from the first VNF to the second VNF.

There is also disclosed an example, wherein cloning the configuration data comprises iterating until a page containing the configuration data is clean.

There is also disclosed an example, wherein the configuration data comprises routing tables.

There is also disclosed an example, wherein cloning the configuration data comprises reading the configuration data from a disk.

There is also disclosed an example, further comprising reading static data for the first VNF from non-volatile storage.

There is also disclosed an example, further comprising taking a single snapshot of billing or statistical data from the first VNF.

There is also disclosed an example, further comprising retroactively correcting the billing or statistical data.

There is also disclosed an example of an apparatus comprising means for performing the method.

There is also disclosed an example, wherein the means for performing the method comprise a processor and a memory.

There is also disclosed an example, wherein the memory comprises machine-readable instructions, that when executed cause the apparatus to perform the method.

There is also disclosed an example, wherein the apparatus is a computing system.

There is also disclosed an example of at least one computer readable medium comprising instructions that, when executed, implement the method or realize the apparatus.

What is claimed is:

1. A computing apparatus, comprising:
a processor;
a memory; and
circuitry to:
determine that a first virtual network function (VNF) instance, providing a virtual service appliance on a virtual network, is to be migrated;
provision a second VNF instance of the virtual service appliance;
copy configuration data and billing or statistical data from the first VNF instance to the second VNF instance;
snapshot in-flight traffic data of the first VNF instance;
while the first VNF instance is running, start the second VNF instance with the snapshot of the in-flight traffic data;
after determining that the second VNF instance has reached a state to handle traffic, halt the first VNF instance and begin directing traffic to the second VNF instance without attempting to synchronize in-flight traffic data between the first VNF instance and second VNF instance; and
retroactively correct the billing or statistical data of the second VNF instance.

2. The computing apparatus of claim 1, wherein the first VNF instance is a network forwarding function.

3. The computing apparatus of claim 1, wherein the circuitry is further to reconfigure the virtual network.

4. The computing apparatus of claim 3, wherein reconfiguring the virtual network comprises gradually redirecting traffic from the first VNF instance to the second VNF instance.

5. The computing apparatus of claim 3, wherein reconfiguring the virtual network comprises performing ordered close of management interface sessions on the first VNF instance.

6. The computing apparatus of claim 1, wherein the circuitry is to provide smart failover from the first VNF instance to the second VNF instance.

7. The computing apparatus of claim 1, wherein cloning the configuration data comprises iterating until a page containing the configuration data is clean.

8. The computing apparatus of claim 1, wherein the configuration data comprises routing tables.

9. The computing apparatus of claim 1, wherein cloning the configuration data comprises reading the configuration data from a disk.

10. The computing apparatus of claim 1, wherein the circuitry is further to read static data for the first VNF instance from non-volatile storage.

11. One or more tangible, non-transitory computer-readable storage mediums having stored thereon executable instructions to:
   determine that a first virtual network function (VNF) instance, providing a virtual service appliance on a virtual network, is to be migrated;
   provision a second VNF instance of the virtual service appliance;
   copy configuration data and billing or statistical data from the first VNF instance to the second VNF instance;
   snapshot in-flight traffic data of the first VNF instance;
   while the first VNF instance is running, start the second VNF instance with the snapshot of the in-flight traffic data;
   after determining that the second VNF instance has reached a state to handle traffic, halt the first VNF instance and begin directing traffic to the second VNF instance without attempting to synchronize in-flight traffic data between the first VNF instance and second VNF instance; and
   retroactively correct the billing or statistical data of the second VNF instance.

12. The one or more tangible, non-transitory computer-readable mediums of claim 11, wherein the first VNF instance is a network forwarding function.

13. The one or more tangible, non-transitory computer-readable mediums of claim 11, wherein the instructions are further to reconfigure the virtual network.

14. The one or more tangible, non-transitory computer-readable mediums of claim 13, wherein reconfiguring the virtual network comprises gradually redirecting traffic from the first VNF instance to the second VNF instance.

15. The one or more tangible, non-transitory computer-readable mediums of claim 13, wherein reconfiguring the virtual network comprises performing ordered close of management interface sessions on the first VNF instance.

16. The one or more tangible, non-transitory computer-readable mediums of claim 11, wherein cloning the configuration data comprises iterating until a page containing the configuration data is clean.

17. The one or more tangible, non-transitory computer-readable mediums of claim 11, wherein the configuration data comprises routing tables.

18. The one or more tangible, non-transitory computer-readable mediums of claim 11, wherein cloning the configuration data comprises reading the configuration data from a disk.

19. The one or more tangible, non-transitory computer-readable mediums of claim 11, wherein the instructions are further to read static data for the first VNF instance from non-volatile storage.

20. A computer-implemented method, comprising:
   determining that a first virtual network function (VNF) instance, providing a virtual service appliance on a virtual network, is to be migrated;
   provisioning a second VNF instance of the virtual service appliance;
   copying configuration data and billing or statistical data from the first VNF instance to the second VNF instance;
   snapshot in-flight traffic data of the first VNF instance;
   while the first VNF instance is running, starting the second VNF instance with the snapshot of the in-flight traffic data;
   after determining that the second VNF instance has reached a state to handle traffic, halting the first VNF instance and begin directing traffic to the second VNF instance without attempting to synchronize in-flight traffic data between the first VNF instance and second VNF instance; and
   retroactively correcting the billing or statistical data of the second VNF instance.

21. The one or more tangible, non-transitory computer-readable mediums of claim 11, wherein the instructions are to provide smart failover from the first VNF instance to the second VNF instance.

22. The computer-implemented method of claim 20, wherein the first VNF instance is a network forwarding function.

23. The computer-implemented method of claim 20, further comprising reconfiguring the virtual network.

24. The computer-implemented method of claim 23, wherein reconfiguring the virtual network comprises gradually redirecting traffic from the first VNF instance to the second VNF instance.

25. The computer-implemented method of claim 23, wherein reconfiguring the virtual network comprises performing ordered close of management interface sessions on the first VNF instance.

* * * * *